United States Patent [19]

Bahr et al.

[11] Patent Number: 5,109,512

[45] Date of Patent: Apr. 28, 1992

[54] PROCESS FOR DISPATCHING TASKS AMONG MULTIPLE INFORMATION PROCESSORS

[75] Inventors: James E. Bahr; Michael J. Corrigan; Diane L. Knipfer; Lynn A. McMahon, all of Rochester; Charlotte B. Metzger, Elgin, all of Minn.

[73] Assignee: International Business Machines Corporation, Armonk, N.Y.

[21] Appl. No.: 531,178

[22] Filed: May 31, 1990

[51] Int. Cl.⁵ .................................... G06F 15/16
[52] U.S. Cl. ............................. 395/650; 364/DIG. 1; 364/228.1; 364/230.3; 364/238.4; 364/281.8
[58] Field of Search ... 364/200 MS File, 900 MS File

[56] References Cited

U.S. PATENT DOCUMENTS

| | | | |
|---|---|---|---|
| 3,760,365 | 9/1973 | Kurtzberg et al. | 364/200 |
| 4,394,727 | 7/1983 | Hoffman et al. | 364/200 |
| 4,394,730 | 7/1983 | Suzuki et al. | 364/200 |
| 4,433,389 | 2/1984 | York et al. | 364/900 |
| 4,480,304 | 10/1984 | Carr et al. | 364/200 |
| 4,590,555 | 5/1986 | Bourrez | 364/200 |
| 4,796,178 | 1/1989 | Jennings et al. | 364/200 |
| 4,807,281 | 2/1989 | Weber et al. | 379/269 |
| 4,809,157 | 2/1989 | Eilert et al. | 364/200 |
| 4,809,168 | 2/1989 | Hennessy et al. | 364/200 |
| 4,814,982 | 3/1989 | Weir | 364/200 |

Primary Examiner—Thomas M. Heckler
Attorney, Agent, or Firm—Frederick W. Niebuhr; J. Michael Anglin

[57] ABSTRACT

In connection with an information processing network in which multiple processing devices have individual cache memories and also share a main storage memory, a process is disclosed for allocating multiple data operations or tasks for subsequent execution by the processing devices. A plurality of task dispatching elements (TDE) forming a task dispatching queue are scanned in an order of descending priority, for either a specific affinity to a selected one of the processing devices, or a general affinity to all of the processing devices. TDEs with specific affinity are assigned immediately if the selected processor is available, while TDEs of general affinity are reserved. TDEs with a specific affinity are bypassed if the selected processor is not available, or reserved if a predetermined bypass threshold has been reached. Following the primary scan a secondary scan, in an order of ascending priority, assigns any reserved tasks to the processing devices still available, without regard to processor affinity. Previously bypassed tasks can be assigned as well, in the event that any processor remains available. A further feature of the network is a means to reset the processor affinity of a selected task from the specific affinity to the general affinity. Resetting is accomplished through an assembly level instruction contained in the task, and either can be unconditional, with reset occurring whenever the task is executed on one of the processing devices, or can occur only upon the failure to meet a predetermined condition while the task is executing.

17 Claims, 5 Drawing Sheets

Fig.-7
SKIP = 1

| TDE | AFF |
|---|---|
| A | 18 |
| B | 20 |
| C | 22 |
| D | 24 |

Fig.-8
SKIP = 1

| TDE | AFF |
|---|---|
| A | 18 |
| B | 18 |
| C | 18 |
| D | 18 |
| E | 20 |

Fig.-9
SKIP = 1

| TDE | AFF |
|---|---|
| A | ALL |
| B | 18 |
| C | ALL |
| D | 18 |
| E | ALL |

Fig.-10
SKIP = 2

| TDE | AFF |
|---|---|
| A | 18 |
| B | 18 |
| C | 18 |
| D | 18 |
| E | 18 |

Fig.-11
SKIP = 2

| TDE | AFF |
|---|---|
| A | 22 |
| B | ALL |
| C | 22 |
| D | 22 |
| E | 22 |

PROCESS FOR DISPATCHING TASKS AMONG MULTIPLE INFORMATION PROCESSORS

BACKGROUND OF THE INVENTION

The present invention relates to information processing systems in which multiple processing devices with cache memories are coupled to a shared main storage memory, and more particularly to a process for allocating tasks or operations among the processors.

In data processing systems employing two or more processing devices, in which multiple tasks or operations on data are eligible to be performed or executed by more than one of the processing devices, there is a need to allocate the various tasks among the processing devices. It is advantageous to execute the various tasks in a manner which favors the more important or higher priority tasks for earlier performance. One approach to meeting these requirements is a task dispatching apparatus for an asymmetric or symmetric multiprocessing system, disclosed in U.S. Pat. No. 4,394,727 (Hoffman et al), incorporated in this application by reference. A task dispatching queue (TDQ) includes a collection of task dispatching elements (TDE), each such element associated with a task and signifying the priority of its associated task. Each of the processors has a signal dispatcher that examines the TDQ to determine if the processor is running a task having a lower priority than any task in the queue, as indicated by the task dispatching element. If so, a task dispatcher of the processor switches to the higher priority task. Thus, the Hoffman system continually favors the highest priority tasks for earliest execution.

U.S. Pat. No. 4,796,178 (Jennings et al) is drawn to a task control mechanism for maintaining a queue of available processes associated according to an assigned priority for a plurality of central processors. Each of the processors may be assigned to the highest priority task available when not executing a task of higher priority. A processor identification is employed to prevent other processors from gaining access to the same task. In U.S. Pat. No. 4,807,281 (Weber et al), a processor can store a protective code corresponding to its address at a location associated with a particular job or task, but not if another processor already has entered its code at the job. A processor, upon detecting the protective code of another processor associated with the task data, forwards its own task to the other processor to reroute the job, to prevent a single job from running on more than one processor simultaneously.

In certain multiprocessor systems, each of the processors not only shares a common main storage memory, but has its own cache memory. This feature can substantially enhance network performance, since each time one of the processing devices performs a data store or data fetch operation in its associated cache memory rather than in the shared main memory, memory access time is substantially reduced.

When a task is executing on a particular one of the processing devices, the cache memory of that processing device accumulates working data and instructions pertinent to that task as the task continues to execute. In other words, the task develops a natural affinity to the particular processing device. However, once the task is switched out of that processor, its natural affinity for that processor tends to decay, for either of two reasons. First, subsequent tasks executing on that processor enter their own data into the cache memory, replacing data pertinent to the original task. Alternatively, the original task may execute, but on another processor. Data stores performed in the course of such further execution invalidate corresponding data in the original cache memory. Accordingly, a task usually has the strongest natural affinity for the processing device which has most recently performed or executed the task.

In view of the above, it is not surprising in that in multiprocessor information systems with individual cache memories, performance is improved when tasks are selectively allocated to processors for which they have affinity. Such a task allocation, however, frequently competes with allocation based on task priority, which of course contemplates assigning the highest priority task to the first available processor, without regard for affinity.

Therefore, it is object of the present invention to provide a task allocation system capable of balancing the competing objectives of executing tasks on processors for which they have the greatest affinity, favoring the highest priority tasks, and providing a substantially equal processing load to all processing devices.

Another object of the invention is to provide a means for associating tasks with particular processors in a manner that approximates their natural affinities.

A further object is to provide a system for allocating tasks based on processor affinity, with means for preempting affinity-related allocation in response to detecting an imbalance of work load among processing devices.

Yet another object is to provide a means for marking tasks as having affinities to particular processors of a network, or alternatively as having an affinities for all such processors, to redistribute tasks across the network when desired.

SUMMARY OF THE INVENTION

To achieve these and other objects, there is provided a process for associating each one of a plurality of data operations with one of a plurality of processing devices, for subsequent execution of the operation by the associated processing device. The process is performed on an information processing network including a main memory having memory locations for storing bit-encoded data, a plurality of processing devices for manipulating bit-encoded data, and a main storage interface connected to the processors and to the main memory. Each of the processing devices has a cache memory including a plurality of cache locations for storing bit-encoded data. Each processor further includes means for storing and retrieving bit-encoded data to and from the main storage memory via the main storage interface, as well as means for storing and retrieving bit-encoded data to and from its associated cache memory. The bit-encoded data includes data operations, each of which has priority indicia, and further has affinity indicia to indicate either a general affinity to more than one of the processing devices, or a specific affinity to a selected one of the processing devices.

Allocation includes the following steps:

(a) performing a primary scan of the data operations, preferably in an order of descending priority beginning with the highest priority data operation, including scanning the affinity indicia of each data operation for the presence of a specific affinity;

(b) for each data operation having a specific affinity for a selected one of the processing devices, either (i) assigning the data operation to the selected processing device if the processing device is available for the assignment, or (ii) bypassing the data operation in the event that a higher priority data operation has been assigned to the selected processing device;

(c) in the event that the data operation has a general affinity, proceeding to the data operation having the next highest priority;

(d) continuing steps (b) and (c) until each one of the processing devices has an associated one of the data operations assigned to it; and (e) dispatching each assigned operation to its associated processing device.

Preferably, the process further includes setting a bypass threshold. After bypassing a number of data operations equal to the bypass threshold, each subsequently scanned data operation is assigned to one of the processing devices to which a data operation has not yet been assigned. In other words, any data operation having specific affinity for a processing device that was already assigned to a higher priority data operation is treated as if it had general affinity as in step (c).

Further, upon detecting a general affinity as in step (c) above, it is preferable to reserve each data operation having a general affinity for a subsequent assignment to one of the processing devices. Then, when the number of reserved data operations equals the number of processing devices still available, a secondary scan is performed upon previously scanned data operations. Then, each previously reserved data operation is assigned to one of the remaining available processing devices.

A further step of the process can be utilized in the event that after the secondary scan and assignment of all remaining reserved processing devices, one or more processing devices remains available while unassigned data operations remain, having been bypassed according to step (b) above. Then, the previously bypassed data operations are assigned, disregarding their specific affinity, to the next available processor, until each task has been assigned a processor. The secondary scan, of previously reserved as well as previously scanned data operations, preferably is performed in the reverse order of the primary scan, i.e. in order of ascending priority.

As the data operations are dispatched to their associated processors, the affinity indicia for each operation preferably are modified to identify each operation or task as having a specific affinity to the processor to which it is dispatched. Later, when a task is switched out of its associated processor, it retains its specific affinity. When reassigned, the task is more likely to be assigned to the associated processor once again.

Another feature of the present invention resides in a means for either conditionally or unconditionally modifying the indicia of tasks from a specific affinity to a general affinity. More particularly, each task or operation corresponds to a task dispatching element (TDE) that includes an affinity field. Each affinity field is set by entering a binary word identifying a particular processing device. However, when a certain task is switched out of a processor, it may not return for further execution for a long time. This raises the likelihood that the cache memory no longer will be "hot" in the sense of retaining data and instructions pertinent to that task upon its return. In this event, instructions associated with the task reset the TDE affinity field to a general affinity for all of the processing devices, or alternatively may reset the affinity field upon a failure to satisfy a predetermined condition. The unconditional reset instruction is preferably used in connection with tasks of a high priority, in order to avoid preemption of such tasks by lower priority tasks.

In accordance with the present invention, a specific affinity normally is assigned to each data operation or task, thus substantially increasing the likelihood that such task, when reassigned to one of a plurality of processors, is associated with the processor that previously executed the task. This substantially increases the number and proportion of tasks executed using the cache memory as opposed to the main storage memory. Increased use of the cache memories enhances network efficiency, since gaining access to data from one of the cache memories consumes less time than accessing the same data from main storage. Overall processing network efficiency is thus increased.

A salient feature of the present invention is that such gains in efficiency are achieved without sacrificing the ability to set higher priorities for relatively important tasks, and without causing or permitting an imbalance of work load among the various processing devices. More particularly, the option to reset processor affinity for selected tasks, in combination with reserving the tasks with general affinity during the primary scan, ensures that such tasks are not subject to excessive delay from the assignment of lower priority tasks with specific processor affinity. When previously reserved and in some cases previously bypassed tasks are assigned during the secondary scan and without regard to processor specific affinity, the result is a substantially equal distribution of work load among the processors. Thus, in accordance with the present invention, a compromise or balance is achieved among competing objectives of high cache usage, favoring high priority tasks and substantially equal distribution of work load among processing devices.

IN THE DRAWINGS

For a further understanding of the above and other features and advantages, reference is made to the following detailed description and to the drawings, in which.

DETAILED DESCRIPTION OF THE PREFERRED EMBODIMENT

To facilitate an understanding of the preferred embodiment, this description begins with a brief explanation of certain terms used to describe the operation and features of the invention.

IMPI Instructions: Assembly level computer program instructions in microcode. Processing devices execute IMPI instructions sequentially in performing logical operations on data, e.g. store, add, and move-character functions.

IMPI Procedure: An IMPI instruction stream, including the data used by the instruction stream, and the parameters and other information necessary for transferring information to or from other IMPI procedures.

IMPI Task (or Data Operation): A synchronous execution of one or more IMPI procedures, comprising a unit of work executed or executable by a processing device.

Horizontal Microcode (HMC): Microcode that interprets IMPI instructions, i.e. decomposes the IMPI instructions into a series of simpler steps. HMC instructions also are called control words, and govern the state of the hardware.

Cache Memory: This embodiment concerns cache memories of the one-way associative write-through type. Each cache memory holds both data and IMPI instructions.

Natural Affinity: A task or data operation has a natural affinity for a processor, if the cache memory of that processing device contains data and instructions pertinent to that task. Natural affinity tends to increase as the processing device continues to execute the task, and otherwise tends to decay.

Figure 1:
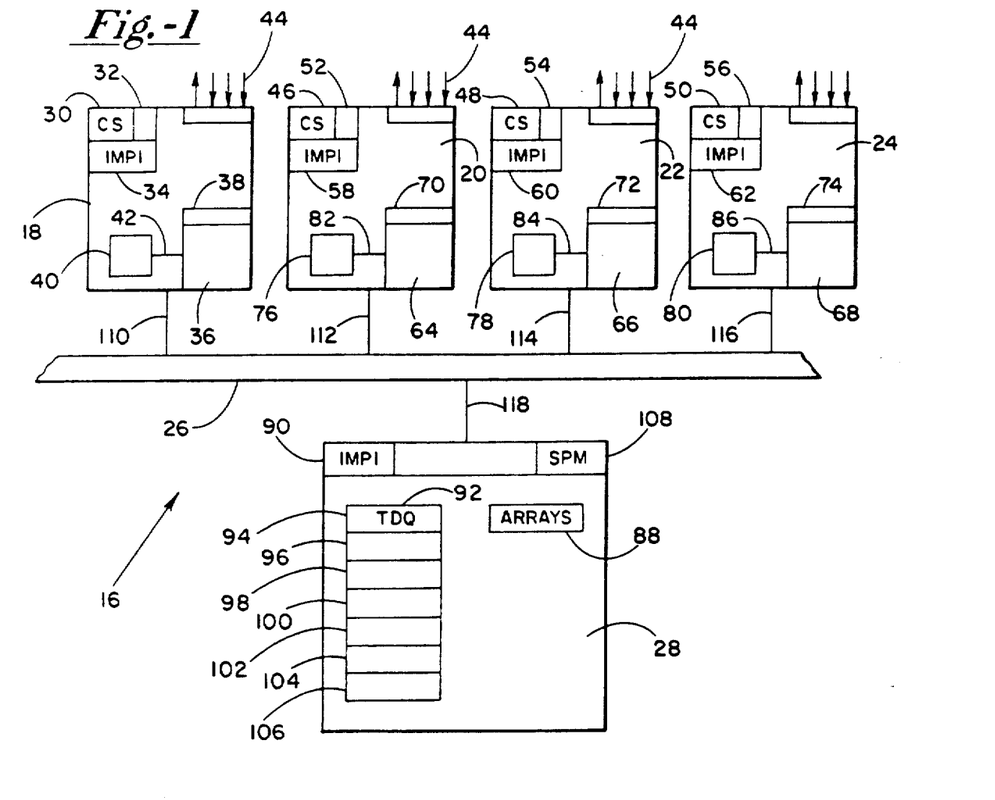
FIG. 1 is schematic view of an information processing system in which multiple processing devices share main storage memory through a common interface.

Turning now to the drawings, there is shown in FIG. 1 an information processing network 16 for storing and performing various operations upon bit-encoded data. The network in this example includes four processing devices indicated 18, 20, 22 and 24, but more or fewer processing devices could be used. An interface 26 couples the processing devices to a main storage memory 28.

Processor 18 includes a control store 30 where the horizontal microcode (HMC) resides. A portion of the horizontal microcode is a dispatching program 2 used in allocating various data operations or IMPI tasks for subsequent execution or performance on one of the processing devices. The processor further includes an array of general purpose IMPI registers 34. When an IMPI task is switched into processor 18 for execution, data and IMPI instructions pertinent to the task are loaded into registers 34 either from main storage memory 28 or from the processor's cache memory 36. When the task is switched out of processor 18, processor data is stored to the main storage memory, and also may be stored to the cache memory, if the associated cache lines are valid.

Processing device 18 further includes a one-way associative store-through cache memory 36, which includes a plurality of cache lines, each associated with a particular set of addresses or locations in the main storage memory. Cache memory 36 further includes a cache directory 38. The cache directory is a record of the main storage memory addresses mapped into the cache memory, and stores an indication of whether each corresponding location in the cache memory is valid or invalid. The directory also contains status bits for each cache line and its associated address in main storage. As indicated at 40, processor 18 includes logic (in the form of semiconductor chip circuitry) for fetching and storing data, and for performing arithmetic logic operations upon bit-encoded data. A portion of logic 40 is dedicated to controlling stores of data to cache memory 36, and fetches or retrieval of data from the cache memory, via a cache interface 42.

Arbitration links at 44 interconnect the four processing devices and are used in combination with arbitration logic residing in the processing devices to assign priority to any one of the processors, in terms of access to interface 26 between the processors and main storage.

Processing devices 20, 22 and 24 are similar to processing device 18, and include respective control stores 46, 48 and 50; respective dispatching programs 52, 54 and 56; and respective IMPI registers 58, 60 and 62. All of dispatching programs 32, 52, 54 and 56 are identical to one another, so that any one of the processing devices can allocate tasks to all of the processing devices, including itself. Each of the processing devices has the same ability to gain control of the program, although only one of the processing devices controls the dispatching program at any given time.

Processing devices 20, 22 and 24 are further like processor 18 in having respective cache memories 64, 66 and 68; respective cache directories 70, 72 and 74; respective store and fetch logic 76, 78 and 80; and respective cache interfaces 82, 84 and 86. These components function in substantially the same manner as their counterparts in processing device 18.

Main storage memory 28 includes memory arrays 88 for storing bit-encoded data, and a program instruction store 90 in which the IMPI instructions are embedded. Also in main storage is a task dispatching queue (TDQ) 92 including a TDQ header 94 and a plurality of task dispatching elements (TDEs) 96-106, arranged in a chain from the highest to the lowest priority. Preferably, main storage memory 28 is comprised of multiple individual memory cards, each having its own memory arrays and its own instruction store segment, the segments cooperating to provide the IMPI instructions. Various memory arrays cooperate to provide the chain of TDEs.

A task-dispatching scratch pad memory 108 in main storage is used for temporarily retaining information useful in allocating tasks, including: (1) an Assigned Processor Count of processors to which a task has been assigned; (2) the identification of assigned processors; (3) an Assigned Task Count; a Dispatchable Task Count of the number of tasks either assigned or reserved for later assignment; (4) a record of which processing devices remain available; (5) a Scanned Task Count; and (6) a Skip Count of bypassed TDEs.

Interface 26 can include a plurality of separate busses (not shown) in parallel, each shared in common by all of the processing devices and the memory cards of main storage. For example, working data (the information of most direct concern to users of the network) is transmitted over a working data bus. A command/address bus transmits information controlling the transmissions of working data, including information as to the address in main storage memory 28 at which working data is to be stored or retrieved. A communication bus transmits the status of working data as the working data is transmitted via the data bus. Data lines 110, 112, 114 and 116 connect processing devices 18, 20, 22 and 24 to interface 26. A data line 118 connects the interface to main storage memory 28, although in the case of multiple memory cards, each card of course has its own data line to the interface.

Figure 2:
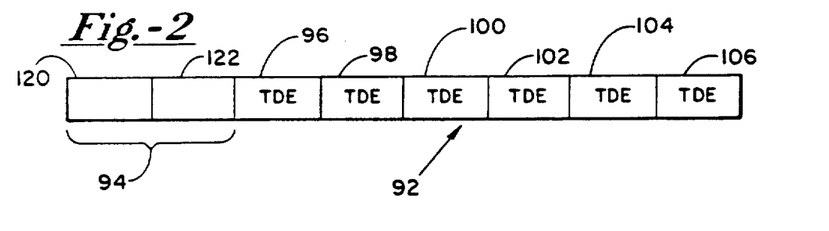
FIG. 2 is a representation of a chain of task objects or locations, each object associated with and identifying one of a plurality of tasks or data operations.

Tasks or data operations eligible for execution by processors 18-24 (i.e. by any one of the processors) are allocated to the processors through the task dispatching program, by which a primary scan is performed to determine the processor affinity for each task. For scanning, the task dispatching elements identifying each of the tasks are arranged in task dispatching queue 92. As seen in FIG. 2, header 94 of the TDQ includes a pointer field 120 and a threshold field 122. The remainder of the TDQ is comprised of task dispatching elements 96–106. Pointer field 120 locates or "points to" the highest priority task, as identified by its corresponding TDE 96. Threshold field 122 contains a value representing the maximum number of task dispatching elements to be bypassed during the primary scan, as is explained in greater detail below.

Figure 3:
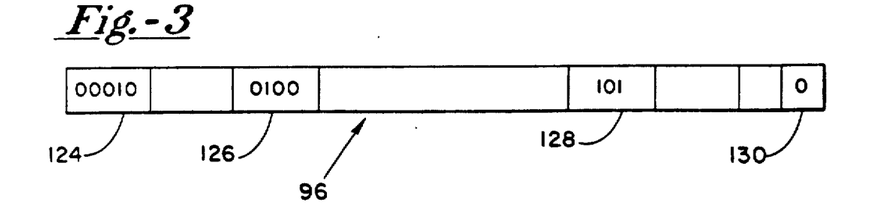
FIG. 3 is a representation of one of the task objects.

The format of task dispatching element 96 is shown in FIG. 3, it being understood that the remaining TDEs have substantially the same format. TDE 96 includes a priority field 124 containing a binary value indicating the priority or importance of the associated task. In this instance, the lower the value in field 124, the higher the priority of the corresponding task. An IMPI queuing function operates on respective priority fields of task dispatching elements 96–106, to arrange the TDEs in a chain of descending priority, i.e. of increasing value in the priority field. Should two or more of TDEs 96–106 have the same priority value, the task later inserted into the TDQ is given the lower priority location along the chain. Task dispatching program 32, 52, 54 or 56 (depending on the controlling processor) scans the task dispatching elements in the order in which they appear in the chain, resulting in scanning the tasks in an order of descending priority based on the position of each TDE within the TDQ, and indirectly based upon the priority field values.

Each task dispatching element further includes a processor affinity field, as indicated at 126 for TDE 96. In connection with a four processor network as described, affinity field 126 includes four bit positions, a binary "1" in a particular bit position indicating a specific affinity, i.e. affinity for only one of the processors. A binary "1" in all of the bit positions indicates a general affinity, i.e. affinity of the task for all four of the processors. Thus, the pattern "0100" in field 126 indicates that the task associated with TDE 96 has an affinity for processing device 20.

The task dispatching element includes two further fields, namely a pointer field 128 and an end-of-chain field 130. Pointer field 128 functions in a manner similar to pointer 120 of the TDQ header, pointing to or locating the task dispatching element of next priority, to provide a "link" in the TDE chain. The end of chain field provides at least one bit position for a binary flag which, when present, indicates that its associated task dispatching element is the final or lowest priority TDE in the task dispatching queue, thus signifying the end of the TDE chain. It is to be understood that the TDEs contain other data fields not directly concerned with the present invention, and thus not described.

Figure 4:
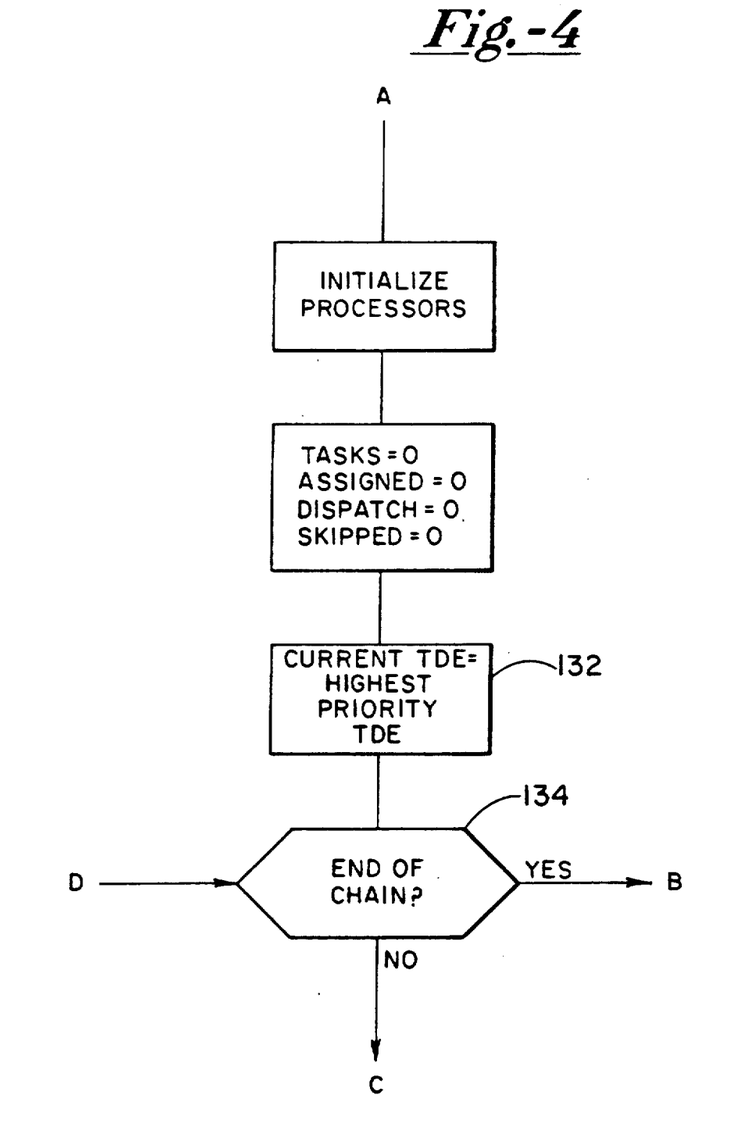
FIGS. 4-6 are sections of a flow chart illustrating a process for assigning task objects from the chain for dispatching to associated processing devices.
Figure 5:
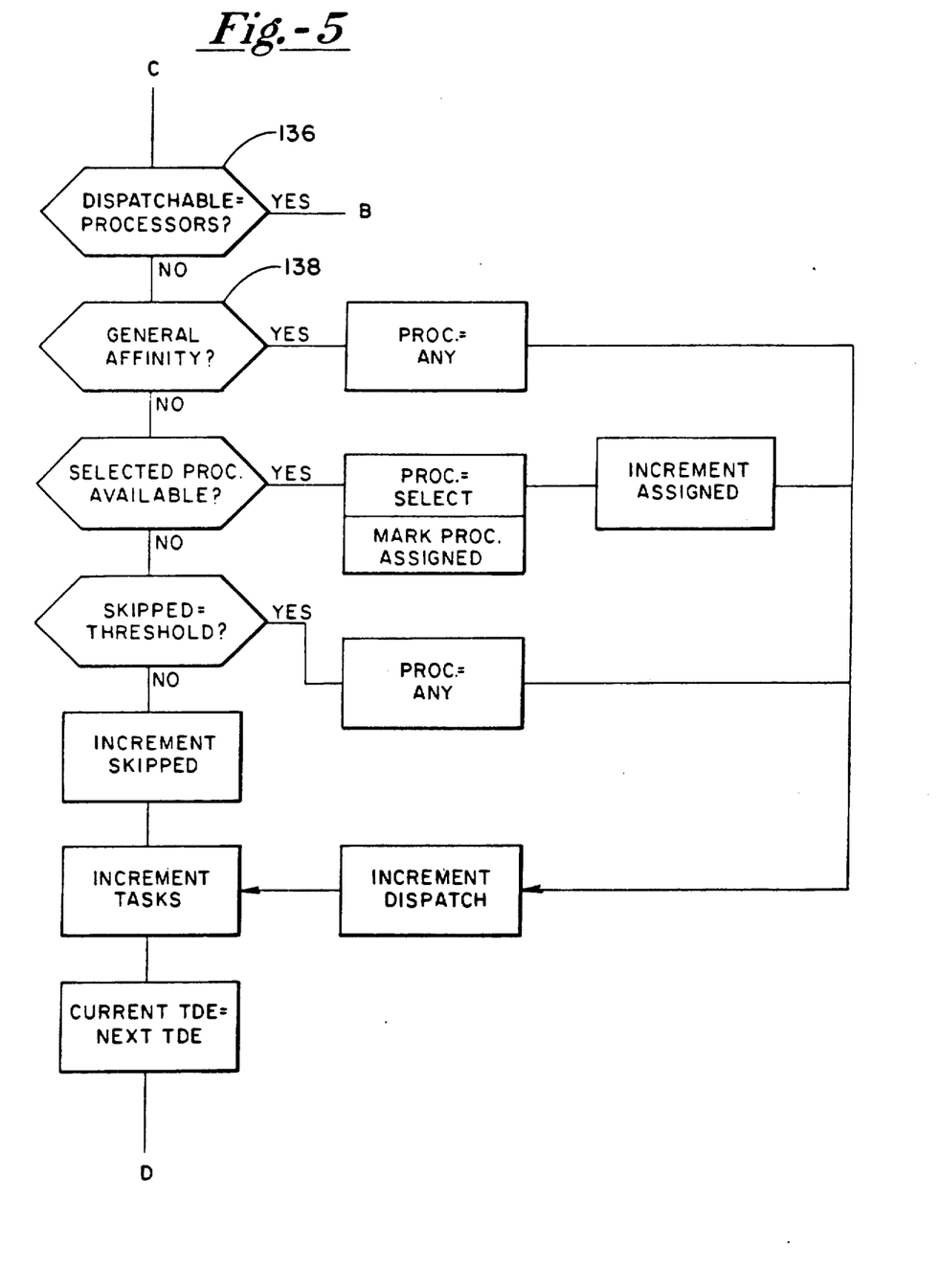
Figure 6:
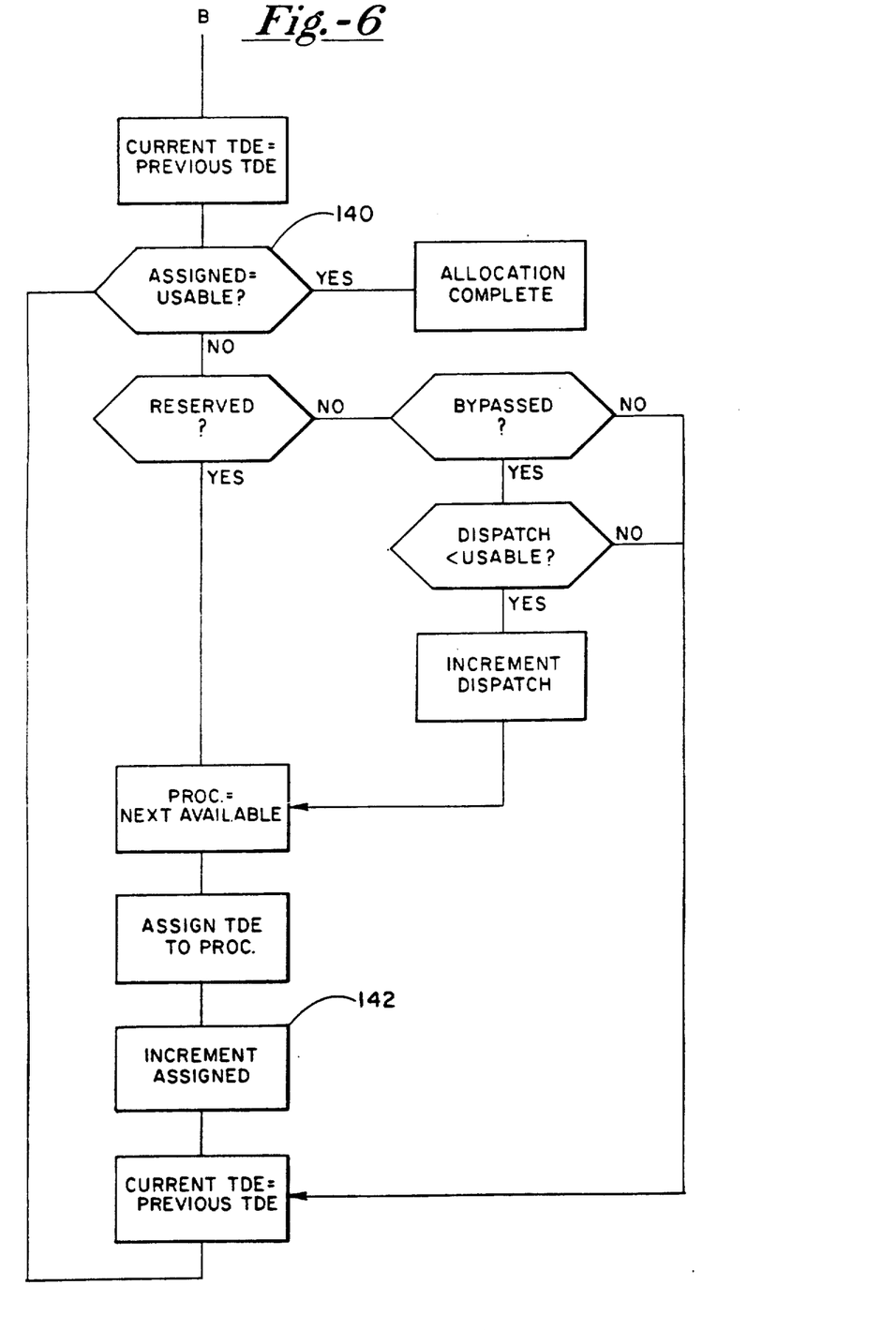

FIGS. 4–6 are sections of a flow chart useful in understanding the manner in which the task dispatching program and task dispatching queue are used to allocate tasks to the processing devices. In general, the TDEs are scanned in order of descending priority, and either assigned to one of the processors, bypassed, or reserved for subsequent assignment. After the primary scan, a secondary scan is performed if necessary to assign any previously reserved tasks to any processing devices not yet associated with a particular task at the end of the primary scan. If necessary, previously bypassed tasks are assigned to any processors not yet associated, to ensure that to the extent possible a task is dispatched to each of the processors.

Before the primary scan, IMPI instructions initialize the contents of scratch pad memory 108 to indicate that all of the processing devices are available. The scratch pad memory further is initialized to indicate that none of the tasks has been assigned, none of the tasks has been either reserved or assigned, none of the tasks has been bypassed, and none of the tasks has been scanned.

The highest priority task dispatching element is considered first, as indicated at 132. Before the scan, there is a determination at 134 of whether the previous TDE scan was the end-of-chain or lowest priority TDE, i.e. whether a flag was detected in the previous end-of-chain field 130. If so, there is no "current TDE" and the process proceeds to the reverse scan. If not, the accumulated number of dispatchable tasks (Dispatchable Task Count) is compared to the number of processors at 136. Once the Dispatchable Task Count equals the number of processors, the process proceeds to reverse scan.

If the Dispatchable Task Count does not yet equal the number of processing devices, the affinity field of the current TDE is scanned. The affinity field of each TDE is scanned at 138 for the presence of a specific affinity indicating one of processing devices 18, 20, 22 and 24; or a general affinity. Here, general affinity refers to having affinity for all four of the processing devices, although in a broader sense, general affinity could indicate affinity for any two or more of the processors. If the TDE has a general affinity, then an appropriate field in scratch pad memory 108 is set to a value "any" to indicate that the task is going to be assigned to a processor, but the particular processor has not yet been determined. The Dispatchable Task Count and Scanned Task Count are incremented, and the process returns to the decision at 134 for either a scan of the next TDE or a shift to reverse scan as previously explained.

Alternatively, if the scan shows the current TDE has a specific affinity at 138, scratch pad memory 108 is searched to determine whether the selected processor remains available, i.e. has not yet been assigned to another, higher priority task. If the selected processing device is available, the scratch pad memory is modified to show the processor as associated with the current task, and the current task dispatching element is assigned to the selected processor. When the current TDE with a specific affinity is assigned, the Assigned Processor Count in scratch pad memory 108 is incremented. The identity of the processor also recorded in the scratch pad memory. As before, the Dispatchable Task Count and Scanned Task Count are incremented.

Returning to decision 138, the scratch pad memory search may yield the result that the selected processing device is not available. In this event the accumulated total of bypassed TDEs (Skip Count) is compared to the threshold value in field 122 of TDQ header 94. If the Skip Count is less than the threshold, the current task is identified as bypassed or skipped in the scratch pad memory, and the Skip Count and the Scanned Task Count are incremented. The Dispatchable Task Count is not incremented.

Returning to decision 138, a final possibility is that a selected processing device is not available to the current task, but the bypass threshold has been reached. In this event, the specific affinity of the TDE is ignored, and scratch pad memory 108 is modified to indicate that the task will be assigned, although the specific processing device is not yet determined. Thus, the current TDE is treated as if it originally had general affinity. It is not yet assigned, but reserved for later assignment.

In any event, either the primary scan completes the chain of task dispatching elements, or the number of tasks either assigned or reserved becomes equal to the number of processors, and allocation proceeds to the reverse scan stage.

At the beginning of the reverse scan, the Assigned Task Count is compared with a "usable" processing device count (Usable Count) equal to the lesser of (i) the number of processing devices and (ii) the number of tasks in the task dispatching queue. If, in view of the comparison at 140, the Assigned Task Count equals the Usable Count, the allocation of tasks is complete, and the tasks are dispatched, each to its associated one of processing devices 18-24. So long as the number of tasks assigned is less than the usable designation, at least one processing device remains available, and at least one task in the TDQ is not yet assigned.

The secondary scan begins with the lowest priority task at the end of the chain and proceeds in an order of ascending priority.

In the secondary search, scratch pad memory 108 is searched in connection with the current TDE for the value of "any" in the processor field, indicating that the current TDE was previously reserved but not assigned. If such is the case, the current task is assigned to the next available processor and the processor is identified in the scratch pad memory as associated with the current task and therefore no longer available. The count of assigned processors is incremented at 142, and the scan proceeds to the next, higher priority TDE. The scan proceeds in this manner for all reserved TDEs, whether reserved because of an original general affinity or because the bypass threshold was reached.

In cases where the sum of the number of processing devices and the bypass threshold exceeds the number of task dispatching elements in the TDQ, there is the possibility of at least one of the processing devices remaining available, along with one or more previously bypassed tasks remaining unassigned. This situation is addressed when the scratch pad memory search for the current TDE fails to find the value "any". Then, the scratch pad memory is further searched for the "skip" indication corresponding to the current TDE. If the skip indication is not found, the current TDE already is assigned, and the scan proceeds to the next task dispatching element.

If the skip indication is found, however, and the Dispatchable Task Count remain less than the Usable Count, the Dispatchable Task Count is incremented, and the current TDE is assigned to the next available processing device, with such processing device then identified in scratch pad memory 108 as no longer available. The Assigned Processor Count is incremented, and the scan proceeds to the next task dispatching element. The reverse scan proceeds until the count of assigned processing devices equals the Usable Count, at which point the allocation process is complete, and tasks are dispatched to their respective processing devices.

Each of FIGS. 7-11 is an example of how a plurality of tasks or data operations, chained in task dispatching queue 92, are allocated in accordance with the primary and secondary scans. In each case, the task dispatching elements are identified individually as A, B, C, etc., in order of descending priority. The affinity of each task at the beginning of the process is listed, indicating one of processing devices 18-24 or "ALL" for a task with general affinity for all of the processors. It is assumed that each of the tasks is eligible for execution on any one of the four processing devices. Finally, the bypass threshold or skip number is shown at the top of each table.

Figure 7:
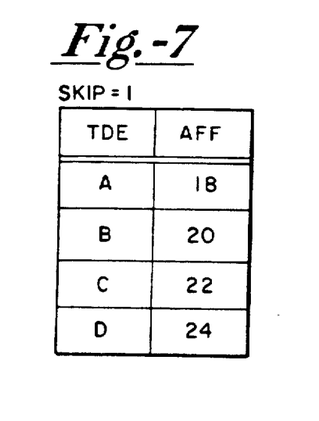
FIGS. 7 through 10 respectively illustrate the process as performed under various conditions.

FIG. 7 illustrates a basic example of four tasks, each with a specific affinity for a different one of the processing devices. The tasks are assigned directly and in the order shown.

Figure 8:
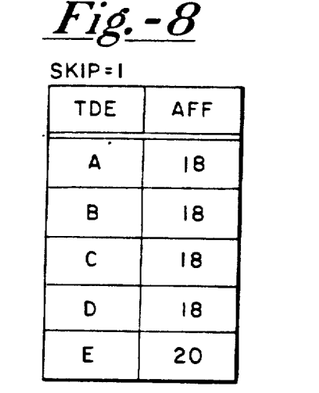

In FIG. 8, task A is assigned immediately but task B is bypassed. Task C is reserved (its affinity changed to "ALL"), since the bypass threshold has been reached. Likewise, task D is reserved. Task E is immediately assigned to processor 20. Then, during the secondary scan, task D is assigned to processor 22 and task C is assigned to processor 24. Task B is not allocated until a subsequent scan, usually as part of a succeeding execution of the task dispatcher. Thus, in a case where allocation based solely on affinity would cause a severe load imbalance and leave two processors idle, the reverse scan assures that all of the processors remain busy.

Figure 9:
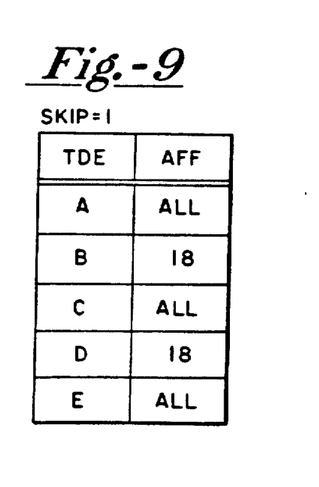

In FIG. 9, tasks A, C and E have a general affinity and thus are reserved during the primary scan, task B is assigned to the processing device 18 for which it has specific affinity. Task D is bypassed. During the reverse scan, tasks E, C and A are assigned to processing devices 20, 22 and 24, respectively.

Figure 11:
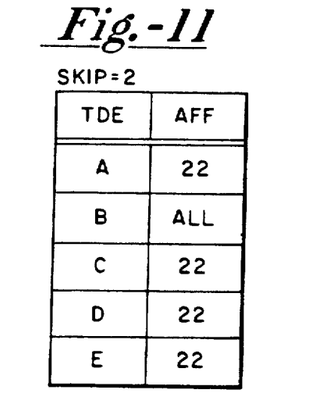

In FIG. 11, all of the tasks have an affinity for processor 18. Task A is assigned immediately, and tasks B and C are bypassed. Tasks D and E are reserved, in view of reaching the bypass threshold. In the reverse scan, task E is assigned to processor 20, task D is assigned to processor 22, and task C, previously bypassed, is assigned to processor 24.

Figure 10:
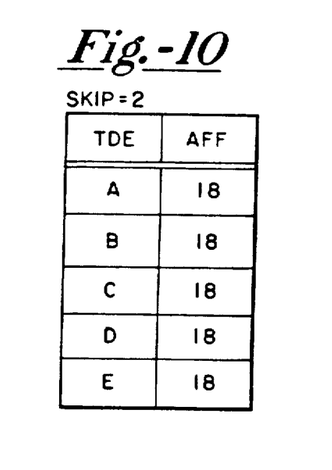

Finally in FIG. 10, all tasks except task B (general affinity) have an affinity for processor 2. Task A is assigned immediately, task B is reserved, and tasks C and D are skipped. The threshold being reached, task E is reserved. In the reverse scan, task E is assigned to processor 18, previously skipped task D is assigned to processor 20, and task B is assigned to processor 24.

Thus, a primary scan based on processor affinity, in combination with a secondary scan of the same tasks but in reverse order, strikes a balance among desirable but sometimes competing objectives of maximizing usage of cache memory, favoring tasks of high priority, and keeping all available processors busy. In connection with network 16 having four processing devices, a bypass threshold of either one or two has been found most satisfactory. It is to be understood that beyond the number of processing devices involved, the nature of the tasks being executed and other factors also will influence selection of the bypass threshold.

One particularly useful feature of the present invention is the dynamic assignment of specific affinity to a given task. More particularly, as a task, previously allocated to a selected processor, is switched into that processor, the affinity field of the corresponding TDE is set to identify that processing device. When the task is switched out of the associated processor, the processor identification remains in the affinity field. Thus, the next time the task is to be allocated, the corresponding TDE exhibits affinity for the selected processor, to maximize the probability of reassignment to the same processing device.

In some cases, however, it is advantageous to prevent the otherwise automatic assignment of processor affinity to a given task. For example, certain IMPI tasks may be identified as having such a high priority that they should never be bypassed during the preliminary scan. Similarly, general affinity for certain high priority tasks might be deemed preferable to the risk of several high priority tasks having the same specific affinity, to avoid a situation of high priority tasks being required to wait while tasks of lower priority are run on other processing devices.

To these ends, a special instruction deemed Reset Processor Affinity (RPA), is included in any chosen IMPI procedure or task. The RPA instruction unconditionally resets the assigned affinity, i.e. inserts a general affinity designation "1111" into the processor affinity field of the corresponding TDE in lieu of the processor identification.

Further in accordance with the present invention, means are provided for resetting the processor affinity field for general affinity, if a certain predetermined condition is not met. More particularly, network 16 utilizes certain "send" and "receive" messages in IMPI instructions to synchronize separate IMPI tasks. For example, a task A, executing on processing device 18, can not be completed until a task B, executing on processor 20, reaches a predetermined stage. Processor 20 issues a send message when task B reaches the predetermined stage. Meanwhile, processor 18 issues a receive instruction, seeking the send message from processor 20, i.e. seeking the indication that task B has reached the predetermined stage.

If task B has not reached the predetermined stage by the time processor 18 provides the receive message, the receive instruction is deemed "not satisfied". Task A is removed from the task' dispatching queue, and task dispatching program 32 switches out task A. Task A then waits for reallocation and dispatching. If the wait is sufficiently long, task A loses its natural affinity for processor 18.

In situations where the waiting period for task A is expected to be sufficiently long to decay natural affinity, a conditional instruction is included in the IMPI task, specifically to reset the affinity field in the event that the receive message is not satisfied. Thus, selected IMPI tasks can be configured for general affinity upon being switched out of one of the processing devices, either unconditionally or subject to an event such as a receive instruction not being satisfied. In combination with the previously described primary and secondary scans, this further ensures that task allocation responsive to assigned affinity does not unduly diminish preference for high priority tasks, or efficiency in work load distribution among processors.

What is claimed is:

1. In an information processing network including a main memory having memory locations for storing bit-encoded data, a plurality of processing devices for manipulating bit-encoded data, and a main storage interface connected to the processing devices and to the main memory; each of the processing devices having a cache memory including a plurality of cache locations for storing bit-encoded data, each processing device further including means for storing and retrieving bit-encoded data to and from the main storage memory via the main storage interface and means for storing and retrieving bit-encoded data to and from its associated cache memory; said bit-encoded data including data operations, each of the data operations having priority indicia and having affinity indicia to indicate either a general affinity for at least two of the processing devices or a specific affinity for a selected one of the processing devices; a process for associating each of the data operations with one of the processing devices for subsequent execution of the operation by the associated processing device, including the steps of:
   (a) performing a primary scan of the data operations, including scanning the affinity indicia of each data operation for the presence of a specific affinity;
   (b) for each of the data operations having a specific affinity for a selected one of the processing devices, either (i) assigning the data operation to the selected processing device if the processing device is available for such assignment, or (ii) bypassing the data operation in the event that a higher priority data operation has been assigned to the selected processing device;
   (c) in the event that the data operation has a general affinity for the processing devices, proceeding to the data operation having the next highest priority;
   (d) performing steps b and c until either all of the data operations have been assigned, or until each one of the processing devices has an associated one of the data operations assigned to it; and
   (e) dispatching each assigned operation to its associated processing device.

2. The process of claim 1 wherein:
said general affinity is an affinity for all of the processing devices.

3. The process of claim 1 wherein said primary scan is performed in order of descending priority of said data operations, beginning with the one of said data operations having the highest priority.

4. The process of claim 1 including the further step of:
setting a bypass threshold prior to said primary scan and, after bypassing a number of the data operations equal to the bypass threshold, assigning each of the subsequently scanned data operations to any one of the processing devices to which a data operation has not yet been assigned, disregarding the specific affinity, if any, of said subsequently scanned operations, until one of the data operations has been assigned to each one of the processing devices.

5. The process of claim 4 wherein said subsequently scanned data operations having specific affinity for a processing device that was already assigned to another data operation is assigned a general affinity.

6. The process of claim 1 including the further steps of:
upon determining no specific affinity for a data operation being scanned, reserving the data operation for subsequent assignment to one of the processing devices;
counting the number of said data operations reserved for subsequent assignment and, responsive to determining that the number of reserved data operations equals the number of said processing devices to which no data operation has been assigned pursuant to step b, performing a secondary scan upon the previously scanned data operations; and
for each of the data operations reserved for subsequent assignment, assigning each said reserved data operations to one of the remaining available processing devices.

7. The process of claim 6 including the further step of:
following said assigning of each reserved data operation, and upon determining that at least one of the processing devices remains available for assignment of a data operation and that at least one of the previously scanned data operations was bypassed, further performing the secondary scan on each said bypassed data operation and assigning it to an available processing device, disregarding the specific affinity, until either (i) all of the processing devices have been assigned one of the data operations; or (ii) all of the data operations have been assigned.

8. The process of claim 6 wherein:
said secondary scan is performed in an order of ascending priority of the data operations.

9. The process of claim 8 wherein:
said step of dispatching the data operations further includes modifying the affinity indicia of each dispatched data operation to exhibit the specific affinity for the processing device to which it is dispatched.

10. The process of claim 8 wherein:
the specific affinity, of each one of the data operations having a specific affinity, is based upon the one of said processing devices that most recently executed the data operation.

11. An information processing network including a main memory having memory locations for storing bit-encoded data, a plurality of processing devices, and a main storage interface connected to the processing devices and to the main memory;
each of the processing devices having a cache memory including a plurality of cache locations for storing bit-encoded data, each processing device further including means for storing and retrieving bit-encoded data to and from the main storage memory via the main storage interface, and means for storing and retrieving bit-encoded data to and from its associated cache memory;
said bit-encoded data including data operations comprising working data and program instructions, said processing devices using instruction streams of the program instructions to manipulate the working data, each said instruction stream comprising a plurality of the program instructions;
wherein the improvement comprises:
processor affinity indicia associated with each of the data operations and identifying the associated data operation as having either a general affinity for at least two of the processing devices, or a specific affinity for a selected one of the processing devices;
data operation allocation means for scanning a plurality of the data operations, and for associating each of the data operations with one of the processing devices for subsequent execution of the instruction stream by the associated processing device, the associating of each data operation being based at least in part upon the affinity indicia of the data operation;
a means for modifying the processor affinity indicia of each data operation, upon the associating of the data operation with one of the processing devices, to exhibit the specific affinity for the associated processing device; and
at least one processor affinity reset means, each affinity reset means being associated with a selected one of the instruction streams, for resetting the processor affinity indicia of the associated selected data operation to exhibit said general affinity as the associated processing device executes the selected instruction stream of the data operation.

12. The information processing network of claim 11 wherein:
each of the data operations includes a processor affinity field, and the processor affinity indicia of each data operation include a binary word in the affinity field.

13. The processing network of claim 12 wherein:
said reset means includes a reset instruction of the program instructions, the reset instruction being inserted into each of the selected instruction streams, said reset instruction, when its associated selected instruction stream is executed by the associated processing device, resetting the binary word in the associated processor affinity field to a value corresponding to said general affinity.

14. The processing network of claim 13 wherein:
said program instructions include a receive instruction and a send instruction in first and second ones of the instruction streams, respectively, for synchronizing the first and second data operations; wherein the receive instruction when executed seeks a message that a predetermined condition is satisfied, and the send instruction when executed provides a message that the condition is satisfied; and wherein the instruction stream of the first data operation, when executed, continues to execute if said message is detected when the receive instruction is executed, and the data operation is switched out of the associated processing device if the message is not detected when the receive instruction is executed; and
wherein the processor affinity field reset means includes a conditional reset means, associated with the instruction stream of the first data operation, for maintaining the specific affinity of the first data operation whenever the message is so detected, and for resetting the processor affinity field of the first data operation when the message is not so detected.

15. The information processing network of claim 14 wherein:
said conditional reset means comprises a binary flag within a field of the receive instruction, operable to cause said resetting only upon the failure to detect said message when the receive instruction is executed.

16. An information processing network including a main storage memory having memory locations for storing bit-encoded data, a plurality of processing devices, and a main storage interface connected to the processing devices and to the main memory;
each of the processing devices having a cache memory including a plurality of cache locations for storing bit-encoded data, each processing device further including means for storing and retrieving bit-encoded data to and from the main storage memory via the main storage interface, and means for storing and retrieving bit-encoded data to and from its associated cache memory;
said bit-encoded data including working data and program instructions, said processing devices using streams of the program instructions to manipulate working data, each of the streams comprising a plurality of the program instructions;
the programming instructions further including receive instructions and send instructions incorporated into first and second ones of the instruction streams, respectively, for synchronizing the first and second data operations, said receive instruction when executed seeking a message that a predetermined condition is satisfied, and said send instruction when executed providing the message that the condition is satisfied, wherein the first data operation continues to execute if the message is detected when the receive instruction is executed, and the first data operation is switched out of the associated processing device if the message is not detected when the receive instruction is executed;

wherein the improvement comprises:
- processor affinity indicia associated with each of the data operations, to identify its associated data operation as having either a general affinity for at least two of the processing devices, or a specific affinity for only a selected one of the processing devices;
- data operation allocation means for scanning a plurality of the data operations, and for associating each of the data operations with one of the processing devices for subsequent execution of the instruction stream of the data operation by the associated processing device, based at least in part upon the affinity indicia of the data operation;
- a means for modifying the processor affinity indicia of each data operation to exhibit the specific affinity for the associated processing device with which the data operation is associated; and
- a conditional reset means, associated with said receive instruction, for resetting the processor affinity indicia of the first data operation to exhibit said general affinity if said message is not detected when the receive instruction is executed, and for leaving the affinity indicia unchanged in the event that said message is detected when the receive instruction is executed.

17. The information processing network of claim 16 wherein:
- each of the data operations includes a processor affinity field for binary data, and wherein the affinity indicia of each instruction stream include a binary word in the affinity field; and
- wherein said conditional reset means includes a binary reset flag in a conditional reset field of the receive instruction, operable to reset the binary word in the processor affinity field of the first data operation only if the message is not detected when the receive instruction is executed.

* * * * *